US010939323B2

(12) United States Patent
Zhao et al.

(10) Patent No.: US 10,939,323 B2
(45) Date of Patent: Mar. 2, 2021

(54) CSI-RS TRANSMISSION METHOD AND NETWORK DEVICE

(71) Applicant: HUAWEI TECHNOLOGIES CO., LTD., Guangdong (CN)

(72) Inventors: Jing Zhao, Shenzhen (CN); Wei Zhao, Shenzhen (CN); Fengyong Qian, Chengdu (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 9 days.

(21) Appl. No.: 16/259,170

(22) Filed: Jan. 28, 2019

(65) Prior Publication Data

US 2019/0159066 A1    May 23, 2019

Related U.S. Application Data

(63) Continuation of application No. PCT/CN2016/092425, filed on Jul. 29, 2016.

(51) Int. Cl.
*H04W 28/06* (2009.01)
*H04W 24/00* (2009.01)
(Continued)

(52) U.S. Cl.
CPC ............ *H04W 28/06* (2013.01); *H04L 5/005* (2013.01); *H04L 5/006* (2013.01); *H04L 5/0051* (2013.01);
(Continued)

(58) Field of Classification Search
None
See application file for complete search history.

(56) References Cited

U.S. PATENT DOCUMENTS 9,148,818 B2 * 9/2015 Yue .................... H04L 5/001
2011/0194551 A1 * 8/2011 Lee ..................... H04B 7/0626
370/342
(Continued)

FOREIGN PATENT DOCUMENTS

CN    102377464 A    3/2012
CN    103037395 A    4/2013
(Continued)

OTHER PUBLICATIONS

R1-152884, Samsung: Discussion on CSI-RS enhancements for FD-MIMO, 3GPP Draft; May 2015. XP050971819. 6 pages.
(Continued)

*Primary Examiner* — Ayaz R Sheikh
*Assistant Examiner* — Tarell A Hampton
(74) *Attorney, Agent, or Firm* — Womble Bond Dickinson (US) LLP (57) ABSTRACT

A CSI-RS transmission method and a network device are provided, to resolve a technical problem that very large pilot resource overheads are occupied for sending CSI-RSs, and reduce pilot transmission resources occupied for sending CSI-RSs, to reduce pilot transmission overheads. The method includes: determining, by a network device, that at least two of M quantities of antenna ports respectively used by M radio remote units RRUs for sending a CSI-RS to same user equipment are not equal, and instructing the M RRUs to send P CSI-RSs on N resource elements, where at least one of the N resource elements carries content of at least two of the P CSI-RSs, the P CSI-RSs are CSI-RSs respectively sent by P RRUs in the M RRUs, M is an integer greater than or equal to 2, P is an integer less than or equal to M, and N is a positive integer.

17 Claims, 3 Drawing Sheets

A network device determines that at least two of M quantities of antenna ports respectively used by M RRUs for sending a CSI-RS to same user equipment are not equal, where M is an integer greater than or equal to 2 — 201

The network device instructs the M RRUs to send P CSI-RSs on N resource elements, where at least one of the N resource elements bears content of at least two of the P CSI-RSs, the P CSI-RSs are CSI-RSs respectively sent by P RRUs in the M RRUs, N is a positive integer, and P is an integer less than or equal to M — 202

(51) Int. Cl.
*H04L 5/00* (2006.01)
*H04W 24/10* (2009.01)
*H04L 1/00* (2006.01)

(52) U.S. Cl.
CPC ........... *H04L 5/0057* (2013.01); *H04W 24/00* (2013.01); *H04W 24/10* (2013.01); *H04L 1/0026* (2013.01); *H04L 5/0035* (2013.01); *H04L 5/0048* (2013.01)

(56) References Cited

U.S. PATENT DOCUMENTS

| | | | |
|---|---|---|---|
| 2012/0120903 A1* | 5/2012 | Kim | H04W 24/08 370/329 |
| 2012/0176939 A1* | 7/2012 | Qu | H04L 5/0023 370/255 |
| 2012/0257553 A1* | 10/2012 | Noh | H04L 5/0057 370/280 |
| 2012/0281567 A1* | 11/2012 | Gao | H04B 7/0626 370/252 |
| 2012/0287799 A1* | 11/2012 | Chen | H04B 7/024 370/252 |
| 2013/0003788 A1* | 1/2013 | Marinier | H04B 7/0626 375/219 |
| 2013/0051240 A1* | 2/2013 | Bhattad | H04L 5/005 370/241 |
| 2013/0077513 A1* | 3/2013 | Ng | H04L 1/0077 370/252 |
| 2013/0148515 A1* | 6/2013 | Ribeiro | H04L 5/0048 370/252 |
| 2013/0156001 A1* | 6/2013 | Gomadam | H04B 7/024 370/330 |
| 2013/0229992 A1 | 9/2013 | Yue et al. | |
| 2013/0286964 A1* | 10/2013 | Chu | H04L 27/261 370/329 |
| 2014/0087720 A1* | 3/2014 | Takano | H04B 7/024 455/422.1 |
| 2014/0153427 A1* | 6/2014 | Seo | H04L 1/20 370/252 |
| 2014/0161093 A1* | 6/2014 | Hoshino | H04B 7/024 370/329 |
| 2014/0226509 A1* | 8/2014 | Ko | H04B 7/0626 370/252 |
| 2014/0241301 A1* | 8/2014 | Nakashima | H04W 52/365 370/329 |
| 2015/0043372 A1* | 2/2015 | Nagata | H04L 5/0057 370/252 |
| 2015/0200755 A1* | 7/2015 | Hammarwall | H04L 5/005 370/329 |
| 2016/0094374 A1* | 3/2016 | Koorapaty | H04W 72/0473 370/329 |
| 2016/0249279 A1* | 8/2016 | Koorapaty | H04W 48/16 |
| 2017/0033904 A1* | 2/2017 | Stirling-Gallacher | H04L 5/0048 |
| 2017/0202014 A1* | 7/2017 | Moon | H04B 7/0626 |

FOREIGN PATENT DOCUMENTS

| | | |
|---|---|---|
| CN | 103650379 A | 3/2014 |
| CN | 105262574 A | 1/2016 |
| EP | 2658329 A1 | 10/2013 |
| JP | 2015511411 A | 4/2015 |
| WO | 2012086734 A1 | 6/2012 |
| WO | 2012112455 A1 | 8/2012 |
| WO | 2012144866 A2 | 10/2012 |
| WO | 2013024991 A2 | 2/2013 |
| WO | 2013093786 A2 | 6/2013 |

OTHER PUBLICATIONS

R1-153792,Huawei et al: "CSI-RS design for 12 and 16 ports ", 3GPP Draft; Aug. 2015. XP050993354. 6 pages.
R1-111662 Research In Motion, UK Limited,"Downlink CSI Feedback for Low-Power Nodes",3GPP TSG RAN WG1 Meeting #65,Barcelona, Spain, May 9-13 , 2011,total 6 pages.
R1-113106 Pantech,"Discussion on CSI-RS configuration for Rel-11",3GPP TSG RAN WG1 Meeting #66-bis,Zhuhai, China, Oct. 10-14, 2011,total 3 pages.

* cited by examiner

FIG. 1

A network device determines that at least two of M quantities of antenna ports respectively used by M RRUs for sending a CSI-RS to same user equipment are not equal, where M is an integer greater than or equal to 2 — 201

The network device instructs the M RRUs to send P CSI-RSs on N resource elements, where at least one of the N resource elements bears content of at least two of the P CSI-RSs, the P CSI-RSs are CSI-RSs respectively sent by P RRUs in the M RRUs, N is a positive integer, and P is an integer less than or equal to M — 202

CSI-RS TRANSMISSION METHOD AND NETWORK DEVICE

CROSS-REFERENCE TO RELATED APPLICATIONS

This application is a continuation of International Application No. PCT/CN2016/092425, filed on Jul. 29, 2016, the disclosure of which is hereby incorporated by reference in its entirety.

TECHNICAL FIELD

The present invention relates to the field of communications technologies, and in particular, to a CSI-RS transmission method and a network device.

BACKGROUND

Figure 1:
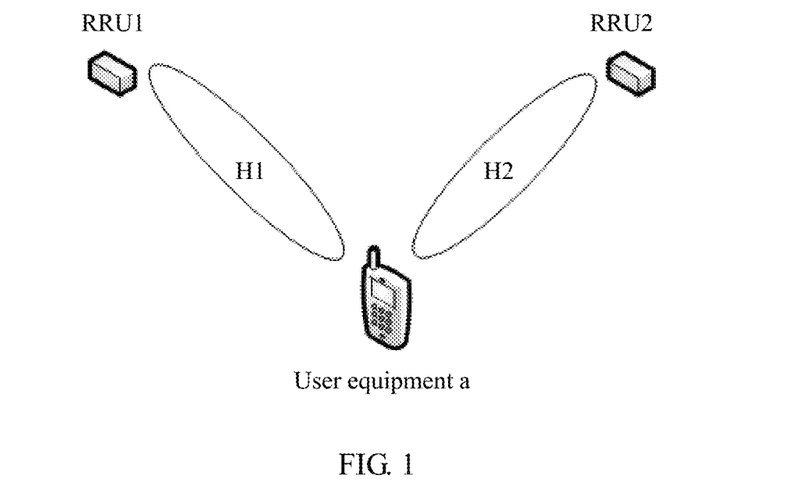
FIG. 1 is a schematic diagram of two RRUs serving same user equipment.

In a communications cell, user equipment (UE) may be classified into an independent user and a joint user based on a quantity of radio remote units (RRU) serving the UE. The independent user indicates that only one RRU serves the UE, and the joint user indicates that a plurality of RRUs serve the UE. For example, as shown in FIG. 1, both an RRU1 and an RRU2 serve user equipment a, and the user equipment a may be considered as a joint user.

Currently, a channel state is usually detected by sending a channel state information-reference signal (CSI-RS). As shown in FIG. 1, the RRU1 sends a CSI-RS to the user equipment a, so that the user equipment a detects a state of a channel H1, and the RRU2 sends a CSI-RS to the user equipment a, so that the user equipment a detects a state of a channel H2.

In actual application, the RRU1 and the RRU2 may use different quantities of antenna ports to send the CSI-RS to the user equipment a. For example, the RRU1 sends a 4-port CSI-RS to the user equipment a, and the RRU2 sends an 8-port CSI-RS to the user equipment a. When not all quantities of ports used by a plurality of RRUs to send the CSI-RS are equal, each RRU occupies a different resource element (RE) to send a corresponding CSI-RS. Consequently, a large quantity of pilot resources are occupied when there are a relatively large quantity of RRUs, causing very large transmission resource overheads occupied for sending CSI-RSs to the UE.

SUMMARY

Embodiments of the present invention provide a CSI-RS transmission method and a network device, so as to resolve a technical problem that massive transmission resources are occupied for sending CSI-RSs.

According to a first aspect, a CSI-RS transmission method is provided, and the method may be applied to a network device. In the method, the network device determines that at least two of M quantities of antenna ports respectively used by M RRUs for sending a CSI-RS to same user equipment are not equal, and then instructs the M RRUs to send P CSI-RSs on N resource elements, where at least one of the N resource elements carries content of at least two of the P CSI-RSs, the P CSI-RSs are CSI-RSs respectively sent by P RRUs in the M RRUs, M is an integer greater than or equal to 2, P is an integer less than or equal to M, and N is a positive integer.

In one embodiment, when determining that at least two of the M quantities of antenna ports respectively used by the M RRUs for sending a CSI-RS to the same user equipment are not equal, the network device may instruct the M RRUs to send the P CSI-RSs on the N REs, and control at least one of the N REs to carry content of at least two of the P CSI-RSs. In other words, when it is determined that not all the quantities of antenna ports corresponding to the M RRUs are equal, content corresponding to a plurality of CSI-RSs may be mapped to a same RE, and the RE may carry information of the plurality of CSI-RSs at a same moment, which is equivalent to multiplexing the RE at a same moment, to improve RE utilization. Therefore, the P CSI-RSs can be transmitted when a relatively small quantity of REs are occupied, further reducing pilot transmission resources occupied for sending CSI-RSs, to reduce pilot transmission overheads.

In addition, information of a plurality of CSI-RSs is sent in an RE multiplexing manner, to be specific, several energy information is superposed on a same RE. This can increase a signal to interference plus noise ratio (SINR) of the user equipment, and further improve accuracy of channel estimation by the user equipment.

In one embodiment, the instructing, by the network device, the M RRUs to send P CSI-RSs on N resource elements includes: determining an RRU meeting a preset condition in the M RRUs; determining the N resource elements based on a quantity of antenna ports used for sending a CSI-RS by the RRU meeting the preset condition; and then instructing the M RRUs to send the P CSI-RSs on the N resource elements.

In this embodiment, the RRU meeting the preset condition is first selected from the M RRUs, and a value of N is determined based on the quantity of antenna ports corresponding to the RRU meeting the preset condition. In other words, a determining range may be first narrowed. For example, one RRU is selected from five RRUs as a reference RRU, and the determining range may be narrowed from five RRUs to one RRU. This can improve determining efficiency to some extent.

In one embodiment, the determining, by the network device, an RRU meeting a preset condition in the M RRUs includes: determining that a first RRU that uses a minimum quantity of antenna ports for sending a CSI-RS to the user equipment in the M RRUs is the RRU meeting the preset condition.

In this embodiment, after the first RRU is determined as the RRU meeting the preset condition, the M RRUs may send the P CSI-RSs by using a minimum quantity of REs, thereby reducing RE occupation to a maximum extent to save pilot overheads to a maximum extent.

In one embodiment, the determining, by the network device, an RRU meeting a preset condition in the M RRUs includes: determining, by the network device in the M RRUs, a first RRU that uses a minimum quantity of antenna ports for sending a CSI-RS to the user equipment; then determining whether the quantity of antenna ports used by the first RRU for sending a CSI-RS is greater than or equal to a preset quantity, to obtain a determining result; and further determining, based on the determining result, the RRU meeting the preset condition.

In some scenarios, if the first RRU is corresponding to a very small quantity of antenna ports, although a minimum quantity of REs may be occupied to simultaneously send the P CSI-RSs, the REs cannot accurately and effectively carry content of all CSI-RSs that need to be sent because of a very small quantity of REs. In other words, the user equipment cannot accurately perform channel estimation because of the very small quantity of REs. Based on this, in one embodiment, to improve accuracy and effectiveness of the channel estimation by the user equipment, it is first determined whether the minimum quantity of antenna ports is greater than or equal to the preset quantity, and the RRU meeting the preset condition is then determined based on the determining result.

In one embodiment, the determining, by the network device based on the determining result, the RRU meeting the preset condition includes: if the determining result indicates that the quantity of antenna ports used by the first RRU for sending a CSI-RS is greater than or equal to the preset quantity, determining that the first RRU is the RRU meeting the preset condition.

In other words, when it is determined that the minimum quantity of antenna ports is greater than or equal to the preset quantity, the minimum quantity of antenna ports may be directly determined as the quantity of REs used to send the P CSI-RSs. The preset quantity is pre-configured based on an actual situation of a communications cell, and therefore this can ensure that a finally determined quantity of REs is not very small, and can ensure accuracy and effectiveness of channel estimation by the user equipment when the pilot overheads are reduced.

In one embodiment, the determining, by the network device based on the determining result, the RRU meeting the preset condition includes: if the determining result indicates that the quantity of antenna ports used by the first RRU for sending a CSI-RS is less than the preset quantity, determining the first RRU and a second RRU as the RRU meeting the preset condition; or determining only the second RRU as the RRU meeting the preset condition, where the second RRU is an RRU that uses a minimum quantity of antenna ports for sending a CSI-RS in the M RRUs except the first RRU, and in other words, the second RRU is an RRU that uses a second minimum quantity of antenna ports for sending a CSI-RS in the M RRUs.

In this embodiment, both the first RRU and the second RRU are determined as the RRU meeting the preset condition, and may respectively occupy two CSI-RS configurations for sending CSI-RSs. To be specific, the first RRU with the minimum quantity of antenna ports is instructed to send a CSI-RS by using an independent CSI-RS configuration, and other RRU is instructed to send a CSI-RS by using the other CSI-RS configuration. This can further ensure accuracy and effectiveness of separately sent CSI-RSs when an RE occupation amount is reduced, so as to improve accuracy of channel estimation by the user equipment.

In addition, when only the second RRU is used as the RRU meeting the preset condition, a quantity of CSI-RS sending times can be reduced and an RE occupation amount can be reduced as much as possible. In addition, channel estimation may be performed, based on the configuration of the network device, on a channel corresponding to each RRU to ensure channel estimation accuracy when the RE occupation amount is reduced.

In one embodiment, the determining, by the network device, an RRU meeting a preset condition in the M RRUs includes: first dividing, in the M RRUs, an RRU using a same quantity of antenna ports for sending a CSI-RS into one group, for example, dividing the M RRUs into K groups of RRUs; then selecting any RRU from each of the K groups of RRUs, where K RRUs are selected in total; and finally determining the selected K RRUs as the RRU meeting the preset condition.

In this embodiment, the M RRUs are grouped based on whether quantities of antenna ports are equal, and the RRU meeting the preset condition is determined based on a grouping result. In other words, a plurality of RRUs corresponding to a same quantity of antenna ports are divided into one group, and the plurality of RRUs corresponding to the same quantity of antenna ports are instructed to use a same CSI-RS configuration to simultaneously send a plurality of corresponding CSI-RSs. The network device can manage the plurality of RRUs in groups when an RE occupation amount is reduced.

In one embodiment, the determining, by the network device, the N resource elements based on a quantity of antenna ports used for sending a CSI-RS by the RRU meeting the preset condition includes: if one RRU meets the preset condition, determining that a quantity of antenna ports used by the RRU for sending a CSI-RS to the user equipment is a value of N; or if at least two RRUs meet the preset condition and the at least two RRUs are some RRUs in the M RRUs, determining that a sum of quantities of antenna ports respectively used by the at least two RRUs for sending a CSI-RS is a value of N.

In a specific implementation process, one or more RRUs in the M RRUs may be determined, based on different preset conditions, as the RRU meeting the preset condition. In other words, in the embodiment of the present invention, one or more RRUs may meet the preset condition.

When one RRU meets the preset condition, the network device may directly determine that a quantity of antenna ports corresponding to the RRU is the value of N. In other words, the quantity of antenna ports corresponding to the RRU is directly determined as the value of N, so that the M RRUs send the P CSI-RSs by using REs of the quantity of antenna ports corresponding to the RRU. Compared with a manner in which the M RRUs respectively send a corresponding CSI-RS by using REs of the quantities of antenna ports corresponding to the M RRUs, an RE occupation amount can be reduced to a relatively large extent to save pilot resources.

When at least two RRUs meet the preset condition and the at least two RRUs are some RRUs in the M RRUs, in other words, when it is determined that at least two RRUs meet the preset condition and a quantity of RRUs meeting the preset condition is less than M, the network device may determine that a sum of quantities of antenna ports respectively corresponding to the at least two RRUs is the value of N, so as to reduce an RE occupation amount, and save transmission resources.

According to a second aspect, a network device is provided, where the network device includes a processor and a memory; the memory is coupled to the processor, the memory is configured to store an instruction, and the processor is configured to execute the instruction to determine that at least two of M quantities of antenna ports respectively used by M RRUs for sending a CSI-RS to same user equipment are not equal; and instruct the M RRUs to send P CSI-RSs on N resource elements, where at least one of the N resource elements carries content of at least two of the P CSI-RSs, the P CSI-RSs are CSI-RSs respectively sent by P RRUs in the M RRUs, M is an integer greater than or equal to 2, P is an integer less than or equal to M, and N is a positive integer.

In one embodiment, that the processor is configured to instruct the M RRUs to send the P CSI-RSs on the N resource elements includes: first determining an RRU meeting a preset condition in the M RRUs; then determining the N resource elements based on a quantity of antenna ports used for sending a CSI-RS by the RRU meeting the preset condition; and further instructing the M RRUs to send the P CSI-RSs on the N resource elements.

In one embodiment, that the processor is configured to determine the RRU meeting the preset condition in the M RRUs includes: determining that a first RRU that uses a minimum quantity of antenna ports for sending a CSI-RS to the user equipment in the M RRUs is the RRU meeting the preset condition.

In one embodiment, that the processor is configured to determine the RRU meeting the preset condition in the M RRUs includes: first determining, in the M RRUs, a first RRU that uses a minimum quantity of antenna ports for sending a CSI-RS to the user equipment; then determining whether the quantity of antenna ports used by the first RRU for sending a CSI-RS is greater than or equal to a preset quantity, to obtain a determining result; and further determining, based on the determining result, the RRU meeting the preset condition.

In one embodiment, that the network device determines, based on the determining result, the RRU meeting the preset condition includes: if the determining result indicates that the quantity of antenna ports used by the first RRU for sending a CSI-RS is greater than or equal to the preset quantity, determining that the first RRU is the RRU meeting the preset condition.

In one embodiment, that the network device determines, based on the determining result, the RRU meeting the preset condition includes: if the determining result indicates that the quantity of antenna ports used by the first RRU for sending a CSI-RS is less than the preset quantity, determining that both the first RRU and a second RRU are the RRU meeting the preset condition; or determining that the second RRU is the RRU meeting the preset condition, where the second RRU is an RRU that uses a minimum quantity of antenna ports for sending a CSI-RS in the M RRUs except the first RRU.

In one embodiment, that the network device determines the RRU meeting the preset condition in the M RRUs includes: dividing an RRU using a same quantity of antenna ports for sending a CSI-RS into one group, so as to divide the M RRUs into K groups of RRUs; then selecting any RRU from each of the K groups of RRUs, where K RRUs are selected in total; and then determining that the K RRUs are the RRU meeting the preset condition, where K is an integer greater than or equal to 2.

In one embodiment, that the network device determines the N resource elements based on a quantity of antenna ports used for sending a CSI-RS by the RRU meeting the preset condition includes: if one RRU meets the preset condition, determining that a quantity of antenna ports used by the RRU for sending a CSI-RS is a value of N; or if at least two RRUs meet the preset condition, determining that a sum of quantities of antenna ports respectively used by the at least two RRUs for sending a CSI-RS is a value of N, where the at least two RRUs are some RRUs in the M RRUs.

According to a third aspect, a CSI-RS transmission function entity is provided, and the CSI-RS transmission function entity may include function modules that are configured to perform the method according to the first aspect or any possible implementation of the first aspect.

According to a fourth aspect, a computer storage medium is provided to store a computer software instruction used by the CSI-RS transmission function entity, and the computer software instruction includes a program designed for the CSI-RS transmission function entity to perform the foregoing aspects.

In this embodiments, an RE is multiplexed during CSI-RS transmission. CSI-RS transmission may be completed when a relatively small quantity of REs are occupied, and pilot transmission resources occupied for sending CSI-RSs are further reduced, to reduce pilot transmission overheads.

These aspects or other aspects of the present invention are concise and understandable in description of the following embodiments.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G (2nd generation mobile communications technology) and 3G (3rd generation mobile communications technology) communications systems and a next-generation communications system, for example, a Global System for Mobile Communications (GSM), a Code Division Multiple Access (CDMA) system, a Time Division Multiple Access (TDMA) system, Wideband Code Division Multiple Access (WCDMA), a Frequency Division Multiple Access (FDMA) system, an orthogonal frequency division multiple access (OFDMA) system, a single carrier FDMA (SC-FDMA) system, a general packet radio service (GPRS) system, a Long Term Evolution (LTE) system, and other such communications systems.

This specification describes various aspects with reference to a network device and/or user equipment.

The network device, for example, a base station (for example, an access point) may be specifically a device that communicates with a wireless terminal over an air interface in an access network by using one or more sectors. The base station may be configured to mutually convert a received over-the-air frame and an Internet protocol (IP) packet and serve as a router between the wireless terminal and a remaining portion of the access network, where the remaining portion of the access network may include an IP network. The base station may coordinate attribute management of the air interface. For example, the base station may be a base transceiver station (BTS) in GSM or CDMA, may be a NodeB (NodeB) in WCDMA, or may be an evolved NodeB (NodeB, eNB, e-NodeB, or evolved Node B) in LTE. This is not limited in the present invention.

The user equipment may be a wireless terminal or a wired terminal. The wireless terminal may be a device that provides a user with voice and/or data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point (AP), a remote terminal, an access terminal, a user terminal, a user agent, a user device, or user equipment (UE).

The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

The following further describes the embodiments of the present invention in detail with reference to accompanying drawings in this specification.

Figure 2:
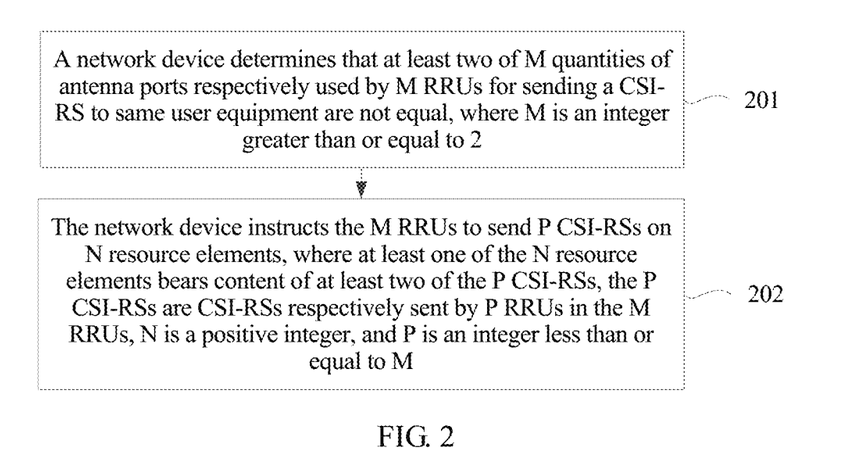
FIG. 2 is a flowchart of a CSI-RS transmission method according to an embodiment of the present invention.

Referring to FIG. 2, an embodiment of the present invention provides a CSI-RS transmission method, and the method may be applied to a network device. A procedure of the method is described as follows.

Operation 201: The network device determines that at least two of M quantities of antenna ports respectively used by M RRUs for sending a CSI-RS to same user equipment are not equal, where M is an integer greater than or equal to 2.

In the embodiment of the present invention, the M RRUs send CSI-RSs to the same user equipment. In other words, the M RRUs serve the same user equipment, and therefore the user equipment may be considered as a joint user. For example, the user equipment includes two, three, or four serving RRUs. In other words, a value of M may be, for example, 2, 3, or 4. In a specific implementation process, the value of M may be pre-configured by the network device or a user, and this is not limited in the embodiment of the present invention.

Generally, a quantity of antenna ports used by each RRU for sending a CSI-RS to the user equipment is pre-configured by the network device, and may be correspondingly configured based on a quantity of transmit antennas included in the RRU. In addition, the antenna port in the embodiment of the present invention is a logical port. One antenna port may be implemented by using one physical antenna or may be implemented by using a combination of several physical antennas. For example, one antenna port may be multiplexed by four physical antenna array elements. In a word, the quantity of antenna ports used by the RRU for sending a CSI-RS is less than or equal to the quantity of transmit antennas included in the RRU.

For example, as shown in Table 1, an RRU1 includes two transmit antennas, and the network device configures, for the RRU1, two antenna ports used for sending CSI-RSs; an RRU2 includes four transmit antennas, and the network device configures, for the RRU2, four antenna ports used for sending CSI-RSs; an RRU3 includes eight transmit antennas, and the network device configures, for the RRU3, eight antenna ports used for sending CSI-RSs; an RRU4 includes 16 transmit antennas and an RRU5 includes 32 transmit antennas, and the network device configures, for each of the RRU4 and the RRU5, eight antenna ports used for sending CSI-RSs; and an RRU 6 includes 16 transmit antennas, and the network device configures, for the RRU6, 16 antenna ports used for sending CSI-RSs.

It can be learned that when an RRU includes a relatively small quantity of transmit antennas, for example, includes two, four, or eight transmit antennas, a quantity of antenna ports used for sending a CSI-RS that is configured by the network device is usually equal to the quantity of transmit antennas included in the RRU. When the RRU includes a relatively large quantity of transmit antennas, for example, includes 16 or 32 transmit antennas, a quantity of antenna ports used for sending a CSI-RS that is configured by the network device is usually less than or equal to the quantity of transmit antennas included in the RRU.

TABLE 1

| RRU number | Quantity of transmit antennas | Quantity of antenna ports |
|---|---|---|
| RRU1 | 2 | 2 |
| RRU2 | 4 | 4 |
| RRU3 | 8 | 8 |
| RRU4 | 16 | 8 |
| RRU5 | 32 | 8 |
| RRU6 | 16 | 16 |

In one embodiment, a quantity of antenna ports used by each of the M RRUs for sending a CSI-RS is pre-configured, each RRU is corresponding to one quantity of antenna ports, and therefore there are M quantities of antenna ports in total. When any two quantities of antenna ports in the M quantities of antenna ports are not equal, it indicates that at least two quantities of antenna ports in the M quantities of antenna ports are not equal. For example, the M quantities of antenna ports are different from each other, or some of the M quantities of antenna ports are different from each other.

Still referring to Table 1, in an example of the RRU1, the RRU2, and the RRU3, it can be learned that quantities of antenna ports respectively used by the three RRUs for sending a CSI-RS are different from each other. In another example of the RRU2, the RRU3, and the RRU4, it can be learned that some of quantities of antenna ports for sending a CSI-RS respectively corresponding to the three RRUs are different from each other. For example, a quantity of antenna ports corresponding to the RRU2 is different from a quantity of antenna ports corresponding to the RRU3, but the quantity of antenna ports corresponding to the RRU3 is equal to a quantity of antenna ports corresponding to the RRU4. To be specific, the quantity of antenna ports corresponding to each of the RRU3 and the RRU4 is eight. It should be noted that in this specification, "a quantity of antenna ports used by an RRU for sending a CSI-RS" is also described as "a quantity of antenna ports corresponding to the RRU" in some cases for ease of description.

Operation 202: The network device instructs the M RRUs to send P CSI-RSs on N resource elements (Resource Element, RE), where at least one of the N resource elements carries content of at least two of the P CSI-RSs, the P CSI-RSs are CSI-RSs respectively sent by P RRUs in the M RRUs, N is a positive integer, and P is an integer less than or equal to M.

The P RRUs may be some RRUs in the M RRUs, and in this case, P is less than M. Alternatively, the P RRUs are the M RRUs, and in this case, P is equal to M. In other words, the M RRUs may simultaneously map content corresponding to M CSI-RSs to the N REs, so as to simultaneously send the M CSI-RSs to the user equipment, or some RRUs in the M RRUs may simultaneously send some CSI-RSs in the M CSI-RSs to the user equipment.

In one embodiment, an RRU sends a CSI-RS to the user equipment according to the instruction of the network device by mapping information corresponding to the CSI-RS to an RE. The RE is also referred to as a resource element, and includes a subcarrier in frequency domain and duration of an orthogonal frequency division multiplexing (Orthogonal Frequency Division Multiplexing, OFDM) symbol in time domain.

In an LTE system, a structure of a transmission resource divided based on time and frequency for each antenna port is as follows: A maximum time unit is a 10-ms radio frame, and is divided into 10 1-ms subframes, and each subframe is further divided into two 0.5-ms slots. For a normal cyclic prefix length, each slot includes seven OFDM symbols, and if an extended cyclic prefix is configured on a cell, each slot includes six OFDM symbols. In frequency domain, every 12 subcarriers form one unit resource. Therefore, one unit resource in frequency and one contiguous slot resource in time are referred to as a resource block (Resource Block, RB). A plurality of REs form one RB, and in other words, one RB includes a plurality of REs.

Figure 3:
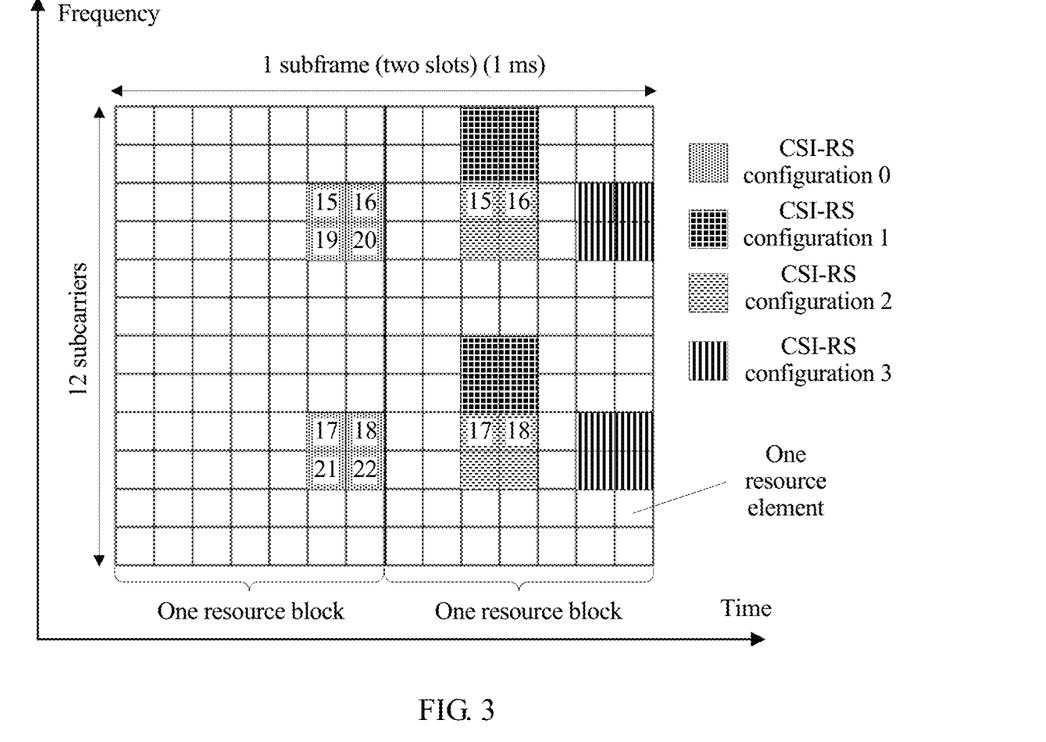
FIG. 3 is a structural diagram of a basic time-frequency resource in an LTE system.

Referring to FIG. 3, FIG. 3 is a structural diagram of a basic time-frequency resource in the LTE system. As shown in FIG. 3, one RB includes 84 REs, and four configurations for sending a CSI-RS are shown in FIG. 3, namely, CSI-RS configurations 0 to 3. An RRU may send a CSI-RS to the user equipment by using any configuration. To be specific, the RRU may map information corresponding to the CSI-RS to an RE in any one of the CSI-RS configurations 0 to 3, to send the CSI-RS to the user equipment. A CSI-RS configuration specifically used by each RRU for sending a CSI-RS to the user equipment may be pre-configured by the user equipment.

In the prior art, when not all quantities of antenna ports respectively corresponding to a plurality of RRUs are equal, each RRU sends a corresponding CSI-RS to the user equipment by using an RE in a CSI-RS configuration. Therefore, when there are a relatively large quantity of RRUs, a relatively large quantity of REs are occupied. However, as shown in FIG. 3, a quantity of REs is limited, and if a large quantity of REs are occupied for sending CSI-RSs, a quantity of REs used to transmit communications data or another signal is relatively reduced, causing very large pilot resource overheads and relatively low RE utilization.

Based on the foregoing description, in one embodiment of the present invention, when determining that at least two of the M quantities of antenna ports respectively used by the M RRUs for sending a CSI-RS to the same user equipment are not equal, the network device may instruct the M RRUs to send the P CSI-RSs on the N REs, and control at least one of the N REs to carry content of at least two of the P CSI-RSs. In other words, when it is determined that not all the quantities of antenna ports corresponding to the M RRUs are equal, content corresponding to a plurality of CSI-RSs may be mapped to a same RE, and the RE may carry information of the plurality of CSI-RSs at a same moment, which is equivalent to multiplexing the RE at a same moment, to improve RE utilization. Therefore, the P CSI-RSs can be transmitted when a relatively small quantity of REs are occupied, further reducing CSI-RS sending pilot overheads.

Currently, a quantity of antenna ports for CSI-RS transmission is usually equal to a quantity of occupied REs. For example, two CSI-RS antenna ports need to occupy two REs for transmission, four CSI-RS antenna ports need to occupy four REs for transmission, and eight CSI-RS antenna ports need to occupy eight REs for transmission.

It is assumed that, in the prior-art solution, the RRU3 in Table 1 sends an 8-port CSI-RS by using eight REs marked as 15 to 22 in the CSI-RS configurations 0 in FIG. 3, and the RRU2 in Table 1 sends a 4-port CSI-RS by using four REs marked as 15 to 18 in the CSI-RS configuration 2 in FIG. 3. The RRU3 and the RRU2 occupy 12 REs in total to send the CSI-RSs.

However, in one embodiment of the present invention, quantities of antenna ports respectively corresponding to the RRU3 and the RRU2 are not equal, and the network device may instruct at least some content of the two CSI-RSs sent by the RRU3 and the RRU2 to be simultaneously mapped to a same RE for sending. For example, the same RE is an RE marked as 15 in the CSI-RS configuration 2 in FIG. 3. In other words, the CSI-RSs respectively sent by the RRU3 and the RRU2 occupy the same RE. In this way, the same RE can be multiplexed, and pilot transmission resource overheads are reduced by improving utilization of the same RE.

In one embodiment, the network device may further instruct the RRU3 and the RRU2 to simultaneously send 4-port CSI-RSs by using four REs marked as 15 to 18 in the CSI-RS configuration 2 in FIG. 3. In other words, an original 8-port CSI-RS of the RRU3 is re-configured as a 4-port CSI-RS, and a quantity of ports used by the RRU2 keeps unchanged. In addition, the network device instructs the RRU3 and the RRU2 to simultaneously send a corresponding CSI-RS by using REs (four REs marked as 15 to 18 in the CSI-RS configuration 2 in FIG. 3) at a same location. Therefore, each RE in the four REs marked as 15 to 18 in the CSI-RS configuration 2 carries content of the two CSI-RSs, and in this case, only four REs are occupied in total to simultaneously send the two CSI-RSs of the RRU3 and the RRU2. Compared with the prior-art solution of occupying 12 REs, an RE occupation amount is significantly reduced, and therefore pilot overheads can be reduced to a relatively large extent.

In an actual application, there may be a plurality of cases of the quantities of antenna ports respectively corresponding to the M RRUs. Before instructing the M RRUs to send the P CSI-RSs on the N REs, the network device needs to determine the N REs. Specifically, a specific quantity of REs included in the N REs, namely, a value of N, needs to be determined, and specific locations of the N REs need to be determined. The specific locations of the N REs such as a CSI-RS configuration in FIG. 3 that needs to be used may be pre-configured by the network device in a specific implementation process.

The value of N may be determined based on the quantities of antenna ports respectively corresponding to the M RRUs. There is a correspondence between a quantity of antenna ports and a quantity of REs, to be specific, the quantity of antenna ports is usually equal to the quantity of REs. Therefore, a manner of determining the value of N based on the quantities of antenna ports respectively corresponding to the M RRUs is relatively direct and quick. In addition, a quantity of antenna ports used by each RRU for sending a CSI-RS is pre-configured by the network device, and therefore the network device can quickly determine the value of N based on a quantity of antenna ports corresponding to an RRU.

In one embodiment of the present invention, the network device may first determine an RRU meeting a preset condition in the M RRUs, and then determine the value of N based on a quantity of antenna ports used for sending a CSI-RS by the RRU meeting the preset condition. In other words, the network device may first select a reference RRU in the M RRUs, and then determine the value of N based on a quantity of antenna ports corresponding to the reference RRU.

The RRU meeting the preset condition is first selected from the M RRUs, and the value of N is determined based on the quantity of antenna ports corresponding to the RRU meeting the preset condition. In other words, a determining range may be first narrowed. For example, one RRU is selected from five RRUs as a reference RRU, and the determining range may be narrowed from five RRUs to one RRU. This can improve determining efficiency to some extent.

In addition, the determining range is narrowed, and therefore the quantity of antenna ports corresponding to the RRU meeting the preset condition is usually less than or far less than a sum of the quantities of antenna ports respectively corresponding to the M RRUs. The quantity of antenna ports is usually equal to the quantity of REs, and therefore an RE occupation amount may be reduced to a relatively large extent to save pilot resources.

In one embodiment, one or more RRUs in the M RRUs may be determined, based on different preset conditions, as the RRU meeting the preset condition. In other words, in the embodiment of the present invention, one or more RRUs may meet the preset condition.

When one RRU meets the preset condition, the network device may directly determine that a quantity of antenna ports corresponding to the RRU is the value of N. In other words, when one RRU meeting the preset condition is determined in the M RRUs, for example, when the RRU2 in Table 1 is determined as the RRU meeting the preset condition, the quantity of antenna ports corresponding to the RRU2 is four, and therefore the M RRUs may be instructed to send corresponding CSI-RSs by using four REs.

The quantity of antenna ports corresponding to the RRU is directly determined as the value of N, so that the M RRUs send the P CSI-RSs by using REs of the quantity of antenna ports corresponding to the RRU. Compared with a manner in which the M RRUs respectively send corresponding CSI-RSs by using REs of the quantities of antenna ports corresponding to the M RRUs, an RE occupation amount can be reduced to a relatively large extent to save pilot resources.

When at least two RRUs meet the preset condition and the at least two RRUs are some RRUs in the M RRUs, in other words, when it is determined that at least two RRUs meet the preset condition and a quantity of RRUs meeting the preset condition is less than M, the network device may determine that a sum of quantities of antenna ports respectively corresponding to the at least two RRUs is the value of N. For example, it is determined the RRU1 and the RRU 3 in the RRU1, the RRU2, the RRU3, and the RRU4 are RRUs meeting the preset condition, and a sum of quantities of antenna ports respectively corresponding to the RRU1 and the RRU 3 is determined as the value of N. The RRU1 is corresponding to two antenna ports, and the RRU3 is corresponding to eight antenna ports, and therefore the value of N may be determined as 10. Based on this, compared with a total quantity of antenna ports corresponding to the RRU1, the RRU2, the RRU3, and the RRU4, an RE occupation amount is reduced to save pilot resources.

For ease of understanding by a person skilled in the art, the following lists several cases as examples to describe an implementation process of determining the RRU meeting the preset condition in the M RRUs.

Case 1:

The network device determines that an RRU that uses a minimum quantity of antenna ports for sending a CSI-RS to the user equipment in the M RRUs is the RRU meeting the preset condition. For ease of description, the RRU that uses the minimum quantity of antenna ports for sending a CSI-RS to the user equipment in the M RRUs is referred to as a first RRU in this specification.

In the first case, the first RRU may be directly determined as the RRU meeting the preset condition. For example, in Table 1, if the M RRUs are five RRUs: the RRU1 to the RRU5, the RRU1 is corresponding to a minimum quantity of antenna ports, and therefore the RRU1 may be determined as the RRU meeting the preset condition. For another example, if the M RRUs are four RRUs: the RRU2 to the RRU5, the RRU2 is corresponding to a minimum quantity of antenna ports, and therefore the RRU2 may be determined as the RRU meeting the preset condition.

After the first RRU is determined as the RRU meeting the preset condition, the M RRUs may send the P CSI-RSs by using a minimum quantity of REs, thereby reducing RE occupation to a maximum extent to save pilot overheads to a maximum extent.

Case 2:

After a first RRU corresponding to a minimum quantity of antenna ports is determined in the M RRUs, it may be determined whether the quantity of antenna ports corresponding to the first RRU is greater than or equal to a preset quantity, and a determining result is obtained. Further, the RRU meeting the preset condition is determined in the M RRUs based on the determining result. In other words, it may be first determined whether the quantity of antenna ports corresponding to the first RRU is greater than or equal to the preset quantity, and then the RRU meeting the preset condition is determined based on the determining result.

In some scenarios, if the first RRU is corresponding to a very small quantity of antenna ports, although a minimum quantity of REs may be occupied to simultaneously send the P CSI-RSs, the REs cannot accurately and effectively carry content of all CSI-RSs that need to be sent because of an very small quantity of REs. In other words, the user equipment cannot accurately perform channel estimation because of the very small quantity of REs. Based on this, in the embodiment of the present invention, to improve accuracy and effectiveness of the channel estimation by the user equipment, it is first determined whether the minimum quantity of antenna ports is greater than or equal to the preset quantity, and the RRU meeting the preset condition is then determined based on the determining result.

In one embodiment, if the determining result indicates that the quantity of antenna ports used by the first RRU for sending a CSI-RS is greater than or equal to the preset quantity, the first RRU is determined as the RRU meeting the preset condition. For example, the preset quantity is four, the M RRUs are four RRUs: the RRU2 to the RRU5 in Table 1, and the minimum quantity of antenna ports are the quantity of antenna ports corresponding to the RRU2, namely, 4. The quantity of antenna ports corresponding to the RRU2 is equal to the preset quantity, and therefore the RRU2 may be directly determined as the RRU meeting the preset condition.

In one embodiment, the network device may set a value of the preset quantity based on a specific situation of a communications cell or other factors, for example, based on a quantity of M RRUs and/or a current RE occupation amount.

In other words, when it is determined that the minimum quantity of antenna ports is greater than or equal to the preset quantity, the minimum quantity of antenna ports may be directly determined as the quantity of REs used to send the P CSI-RSs. The preset quantity is pre-configured based on an actual situation of the communications cell, and therefore this can ensure that a finally determined quantity of REs is not very small, and can ensure accuracy and effectiveness of channel estimation by the user equipment when the pilot overheads are reduced.

In one embodiment, if the determining result indicates that the quantity of antenna ports used by the first RRU for sending a CSI-RS is less than the preset quantity, both the first RRU and a second RRU may be determined as the RRU meeting the preset condition, or only a second RRU is determined as the RRU meeting the preset condition. The second RRU is an RRU with a minimum quantity of antenna ports in the M RRUs except the first RRU. In other words, the second RRU is an RRU with a second minimum quantity of antenna ports in the M RRUs.

For example, the preset quantity is four, the M RRUs are four RRUs: the RRU1 to the RRU4 in Table 1, and the RRU1 is corresponding to the minimum quantity of antenna ports, namely, 2. Two is less than four, and therefore an RRU with the second minimum quantity of antenna ports may be selected from the RRU1 to the RRU4, namely, the RRU2. Further, both the RRU1 and the RRU2 may be determined as the RRU meeting the preset condition. In this case, two RRUs meet the preset condition. Alternatively, only the RRU2 may be determined as the RRU meeting the preset condition.

When both the RRU1 and the RRU2 are determined as the RRU meeting the preset condition, two RRUs meet the preset condition. In this case, each of the RRU2, the RRU3, and the RRU4 may be instructed to send a 4-port CSI-RS, and the RRU1 is instructed to send a 2-port CSI-RS, and therefore six REs are occupied in total. An RE occupation amount can be reduced to a relatively large extent compared with 22 REs that are occupied in total by the RRU1 to the RRU4 to respectively send a CSI-RS. In addition, both the first RRU and the second RRU are determined as the RRU meeting the preset condition, and may respectively occupy two CSI-RS configurations for sending a CSI-RS. To be specific, the first RRU with the minimum quantity of antenna ports is instructed to send a CSI-RS by using an independent CSI-RS configuration, and other RRUs are instructed to send CSI-RSs by using the other CSI-RS configuration. This can further ensure accuracy and effectiveness of a separately sent CSI-RS when an RE occupation amount is reduced, so as to improve accuracy of channel estimation by the user equipment.

When only the RRU2 is determined as the RRU meeting the preset condition, each of the RRU2, the RRU3, and the RRU4 sends a 4-port CSI-RS. The RRU1 includes two transmit antennas, and therefore in this case, the RRU1 may not need to send a CSI-RS, and in other words, the RRU1 may not perform channel state measurement. The RRU1 does not send the CSI-RS, and therefore a total quantity of finally sent CSI-RSs may be less than M, and in other words, P may be less than or equal to M.

In addition, based on configuration of the network device, a channel measurement result of the RRU2, the RRU3, and the RRU4 obtained through CSI-RS sending may be approximately considered as a channel measurement result of the RRU1. In the embodiment of the present invention, when only the second RRU is used as the RRU meeting the preset condition, a quantity of CSI-RS sending times can be reduced and an RE occupation amount can be reduced as much as possible. In addition, channel estimation may be performed, based on the configuration of the network device, on a channel corresponding to each RRU to ensure channel estimation accuracy when the RE occupation amount is reduced.

Case 3:

The network device divides RRUs with a same quantity of antenna ports into one group. For example, the M RRUs are divided into K groups of RRUs based on whether quantities of antenna ports are equal. As shown in Table 1, five RRUs in Table 1 may be divided into three groups based on whether quantities of antenna ports are equal. The RRU1 is a first group, the RRU2 is a second group, and the RRU3, the RRU4, and the RRU5 are a third group.

Further, any RRU is selected from each of the three groups of RRUs, and K RRUs may be selected from K groups. Finally, the selected K RRUs are determined as the RRU meeting the preset condition. After the K RRUs are determined as the RRU meeting the preset condition, each group of RRUs may be instructed to send a corresponding CSI-RS by using a CSI-RS configuration.

For example, after the five RRUs shown in Table 1 are divided into the three groups, an RRU (namely, the RRU1) in the first group may be instructed to occupy two REs to send a 2-port CSI-RS, an RRU (namely, the RRU2) in the second group may be instructed to occupy four REs to send a 4-port CSI-RS, and each RRU (namely, the RRU3, the RRU4, or the RRU5) in the third group may be instructed to occupy eight REs to send an 8-port CSI-RS. For example, the RRU2 may be instructed to occupy four REs marked as 15 to 18 in the CSI-RS configuration 2 shown in FIG. 3, to send the CSI-RS that the RRU2 needs to send, and the RRU3 and the RRU4 may be instructed to simultaneously occupy eight REs marked as 15 to 22 in the CSI-RS configurations 0 shown in FIG. 3, to send two CSI-RSs that the RRU3 and the RRU4 need to send.

The M RRUs are grouped based on whether quantities of antenna ports are equal, and the RRU meeting the preset condition is determined based on a grouping result. In other words, a plurality of RRUs corresponding to a same quantity of antenna ports are divided into one group, and the plurality of RRUs corresponding to the same quantity of antenna ports are instructed to use a same CSI-RS configuration to simultaneously send a plurality of corresponding CSI-RSs. The network device can manage the plurality of RRUs in groups when an RE occupation amount is reduced.

In one embodiment of the present invention, when determining that at least two of the M quantities of antenna ports respectively used by the M RRUs for sending a CSI-RS to the same user equipment are not equal, the network device may instruct the M RRUs to send the P CSI-RSs on the N REs, and control at least one of the N REs to carry content of at least two of the P CSI-RSs. In other words, when it is determined that not all the quantities of antenna ports corresponding to the M RRUs are equal, content corresponding to a plurality of CSI-RSs may be mapped to a same RE, and the RE may carry information of the plurality of CSI-RSs at a same moment, which is equivalent to multiplexing the RE at a same moment, to improve RE utilization. Therefore, the P CSI-RSs can be transmitted when a relatively small quantity of REs are occupied, further reducing pilot transmission resources occupied for sending CSI-RSs, to reduce pilot transmission overheads.

In addition, information of a plurality of CSI-RSs is sent in an RE multiplexing manner, to be specific, several energy information is superposed on a same RE. This can increase an SINR of the user equipment, and further improve accuracy of channel estimation by the user equipment. For example, for one RE (for example, which is referred to as a first RE), energy of the first RE is 1 before the multiplexing. It is assumed that noise is N in this case, and an SINR is 1/N. When information of three CSI-RSs is superposed on the first RE for simultaneously sending, the energy of the first RE is 3, the noise is still N, and the SINR is 3/N. In other words, the SINR is tripled. For the user equipment, a channel estimation result is more accurate because the SINR increases.

Figure 4:
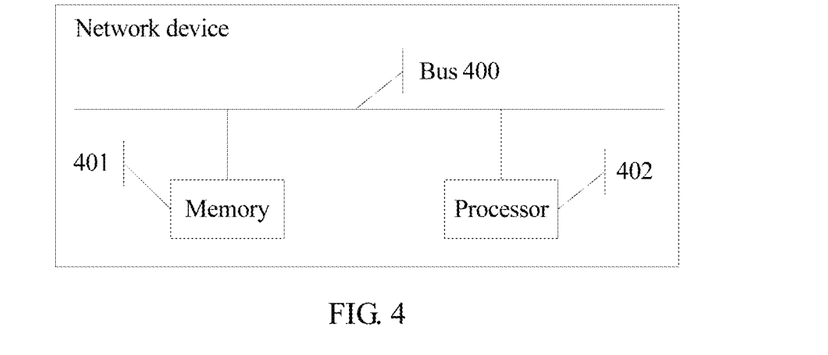
FIG. 4 is a schematic structural diagram of a network device according to an embodiment of the present invention.

Referring to FIG. 4, an embodiment of the present invention provides a network device, and the network device includes a memory 401 and a processor 402. The memory 401 and the processor 402 may be connected to a same bus 400.

The processor 402 may be a central processing unit (CPU) or an application-specific integrated circuit (Application Specific Integrated Circuit, ASIC), may be one or more integrated circuits configured to control program execution, may be a baseband chip, or the like.

There may be one or more memories 401, and one memory 401 is used as an example for graphic description in FIG. 4. The memory 401 may be a read only memory (Read Only Memory, ROM), a random access memory (Random Access Memory, RAM), a magnetic disk memory, or the like. In addition, the memory 401 may further configured to store data, and the like.

Code corresponding to the CSI-RS transmission method shown in FIG. 2 is written permanently into a chip by designing programming for the processor 402, so that when operating, the chip can perform the CSI-RS transmission method shown in FIG. 2. How to design programming for the processor 402 is a well-known technology to a person skilled in the art, and details are not described herein again.

Figure 5:
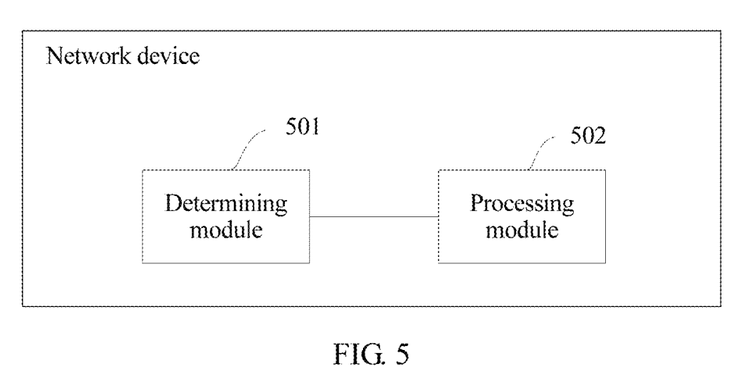
FIG. 5 is a structural block diagram of a network device according to an embodiment of the present invention.

Referring to FIG. 5, an embodiment of the present invention provides a network device, and the network device includes a determining module 501 and a processing module 502. In actual application, an entity device corresponding to the determining module 501 and the processing module 502 may be the processor 402 in FIG. 4.

The network device in the embodiment of the present invention may be configured to perform the CSI-RS transmission method shown in FIG. 2, for example, the network device in the embodiment of the present invention may be the network device described above. Therefore, for functions and the like implemented by the modules in the network device, refer to the description of the foregoing method part, and details are not described herein again.

It may be clearly understood by a person skilled in the art that, for the purpose of convenient and brief description, division of the foregoing function units is taken as an example for illustration. In actual application, the foregoing functions can be allocated to different function units and implemented according to a requirement, to be specific, an inner structure of an apparatus is divided into different function units to implement all or part of the functions described above. For a detailed working process of the foregoing system, apparatus, and unit, reference may be made to a corresponding process in the foregoing method embodiments, and details are not described herein again.

In the several embodiments provided in the present invention, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes: any medium that can store program code, such as a USB flash drive, a removable hard disk, a ROM, a RAM, a magnetic disk, or an optical disc.

The foregoing embodiments are merely used to describe, in detail, the technical solutions of the present invention. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. A channel state information-reference signal (CSI-RS) transmission method, the method comprising:
   determining, by a network device, that at least two of M quantities of antenna ports respectively used by M radio remote units (RRUs) for sending a CSI-RS to same user equipment are not equal, wherein M is an integer greater than or equal to 2;

determining, by the network device, an RRU meeting a preset condition in the M RRUs;

determining, by the network device, N resource elements based on a quantity of antenna ports used for sending a CSI-RS by the RRU meeting the preset condition; and instructing, by the network device, the M RRUs to send P CSI-RSs on the N resource elements, wherein at least one of the N resource elements carries content of at least two of the P CSI-RSs, the P CSI-RSs are CSI-RSs respectively sent by P RRUs in the M RRUs, N is a positive integer, and P is an integer less than or equal to M.

2. The method according to claim 1, wherein the determining an RRU meeting a preset condition in the M RRUs comprises:

determining, by the network device, that a first RRU that uses a minimum quantity of antenna ports for sending a CSI-RS to the user equipment in the M RRUs is the RRU meeting the preset condition.

3. The method according to claim 1, wherein the determining an RRU meeting a preset condition in the M RRUs comprises:

determining, by the network device, a first RRU that uses a minimum quantity of antenna ports for sending a CSI-RS to the user equipment in the M RRUs;

determining, by the network device, whether the quantity of antenna ports used by the first RRU for sending a CSI-RS is greater than or equal to a preset quantity, to obtain a determining result; and determining, by the network device based on the determining result, the RRU meeting the preset condition.

4. The method according to claim 3, wherein the determining the RRU meeting the preset condition comprises:

if the determining result indicates that the quantity of antenna ports used by the first RRU for sending a CSI-RS is greater than or equal to the preset quantity, determining, by the network device, that the first RRU is the RRU meeting the preset condition.

5. The method according to claim 3, wherein the determining the RRU meeting the preset condition comprises:

if the determining result indicates that the quantity of antenna ports used by the first RRU for sending a CSI-RS is less than the preset quantity, determining, by the network device, that the first RRU and a second RRU are the RRU meeting the preset condition; or determining, by the network device, that the second RRU is the RRU meeting the preset condition, wherein the second RRU is an RRU that uses a minimum quantity of antenna ports for sending a CSI-RS in the M RRUs except the first RRU.

6. The method according to claim 1, wherein the determining an RRU meeting a preset condition in the M RRUs comprises:

dividing, by the network device, an RRU using a same quantity of antenna ports for sending a CSI-RS into one group, so as to divide the M RRUs into K groups of RRUs, wherein K is an integer greater than or equal to 2;

selecting, by the network device, any RRU from each of the K groups of RRUs, wherein K RRUs are selected in total; and determining, by the network device, that the K RRUs are the RRU meeting the preset condition.

7. The method according to claim 1, wherein the determining the N resource elements based on a quantity of antenna ports used for sending a CSI-RS by the RRU meeting the preset condition comprises:

if one RRU meets the preset condition, determining, by the network device, that the quantity of antenna ports used by the RRU for sending a CSI-RS is a value of N; or if at least two RRUs meet the preset condition, determining, by the network device, that a sum of quantities of antenna ports respectively used by the at least two RRUs for sending a CSI-RS is a value of N, wherein the at least two RRUs are some RRUs in the M RRUs.

8. A network device, comprising:

a memory configured to store an instruction; and a processor configured to execute the instruction to:

determine that at least two of M quantities of antenna ports respectively used by M radio remote units (RRUs) for sending channel state information-reference signal (CSI-RS) to same user equipment are not equal;

determine an RRU meeting a preset condition in the M RRUs;

determine N resource elements based on a quantity of antenna ports used for sending a CSI-RS by the RRU meeting the preset condition; and instruct the M RRUs to send P CSI-RSs on the N resource elements, wherein at least one of the N resource elements includes content of at least two of the P CSI-RSs, the P CSI-RSs are CSI-RSs respectively sent by P RRUs in the M RRUs, M is an integer greater than or equal to 2, P is an integer less than or equal to M, and N is a positive integer.

9. The network device according to claim 8, wherein that the processor is configured to determine the RRU meeting the preset condition in the M RRUs comprises:

determining that a first RRU that uses a minimum quantity of antenna ports for sending a CSI-RS to the user equipment in the M RRUs is the RRU meeting the preset condition.

10. The network device according to claim 8, wherein that the processor is configured to determine the RRU meeting the preset condition in the M RRUs comprises:

determining a first RRU that uses a minimum quantity of antenna ports for sending a CSI-RS to the user equipment in the M RRUs;

determining whether the quantity of antenna ports used by the first RRU for sending a CSI-RS is greater than or equal to a preset quantity, to obtain a determining result; and determining, based on the determining result, the RRU meeting the preset condition.

11. The network device according to claim 10, wherein that the processor is configured to determine, based on the determining result, the RRU meeting the preset condition comprises:

if the determining result indicates that the quantity of antenna ports used by the first RRU for sending a CSI-RS is greater than or equal to the preset quantity, determining that the first RRU is the RRU meeting the preset condition.

12. The network device according to claim 10, wherein that the processor is configured to determine, based on the determining result, the RRU meeting the preset condition comprises:

if the determining result indicates that the quantity of antenna ports used by the first RRU for sending a CSI-RS is less than the preset quantity, determining that the first RRU and a second RRU are the RRUs meeting the preset condition; or determining that the second RRU is the RRU meeting the preset condition, wherein the second RRU is an RRU that uses a minimum quantity of antenna ports for sending a CSI-RS in the M RRUs except the first RRU.

13. The network device according to claim 8, wherein that the processor is configured to determine the RRU meeting the preset condition in the M RRUs comprises:
   dividing an RRU using a same quantity of antenna ports for sending a CSI-RS into one group, so as to divide the M RRUs into K groups of RRUs, wherein K is an integer greater than or equal to 2;
   selecting any RRU from each of the K groups of RRUs, wherein K RRUs are selected in total; and
   determining that the K RRUs are the RRUs meeting the preset condition.

14. The network device according to claim 8, wherein that the processor is configured to determine the N resource elements based on the quantity of antenna ports used for sending a CSI-RS by the RRU meeting the preset condition comprises:
   if one RRU meets the preset condition, determining that the quantity of antenna ports used by the RRU for sending a CSI-RS is a value of N; or
   if at least two RRUs meet the preset condition, determining that a sum of quantities of antenna ports respectively used by the at least two RRUs for sending a CSI-RS is a value of N, wherein the at least two RRUs are some RRUs in the M RRUs.

15. A non-transitory computer storage medium storing instructions, which when executed by a processor, cause the processor to perform a channel state information-reference signal (CSI-RS) transmission method, the method comprising:
   determining that at least two of M quantities of antenna ports respectively used by M radio remote units (RRUs) for sending a CSI-RS to same user equipment are not equal, wherein M is an integer greater than or equal to 2;
   determining an RRU meeting a preset condition in the M RRUs;
   determining N resource elements based on a quantity of antenna ports used for sending a CSI-RS by the RRU meeting the preset condition; and
   instructing the M RRUs to send P CSI-RSs on the N resource elements, wherein at least one of the N resource elements includes content of at least two of the P CSI-RSs, the P CSI-RSs are CSI-RSs respectively sent by P RRUs in the M RRUs, N is a positive integer, and P is an integer less than or equal to M.

16. The computer storage medium according to claim 15, wherein the determining an RRU meeting a preset condition in the M RRUs comprises:
   determining that a first RRU that uses a minimum quantity of antenna ports for sending a CSI-RS to the user equipment in the M RRUs is the RRU meeting the preset condition.

17. The computer storage medium according to claim 15, wherein the determining an RRU meeting a preset condition in the M RRUs comprises:
   determining a first RRU that uses a minimum quantity of antenna ports for sending a CSI-RS to the user equipment in the M RRUs;
   determining whether the quantity of antenna ports used by the first RRU for sending a CSI-RS is greater than or equal to a preset quantity, to obtain a determining result; and
   determining, based on the determining result, the RRU meeting the preset condition.

* * * * *